US010509968B2

(12) United States Patent
Chen et al.

(10) Patent No.: US 10,509,968 B2
(45) Date of Patent: Dec. 17, 2019

(54) DATA FUSION BASED SAFETY SURVEILLANCE SYSTEM AND METHOD

(71) Applicant: NATIONAL CHUNG SHAN INSTITUTE OF SCIENCE AND TECHNOLOGY, Taoyuan (TW)

(72) Inventors: Jiunn-Tsair Chen, Taoyuan (TW); Chin-Sheng Kuan, Taoyuan (TW); Wei-Jen Chien, Taoyuan (TW); Wen-Hao Hsiao, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 81 days.

(21) Appl. No.: 15/883,206

(22) Filed: Jan. 30, 2018

(65) Prior Publication Data

US 2019/0236375 A1    Aug. 1, 2019

(51) Int. Cl.
*G06K 9/00* (2006.01)
*G06N 5/04* (2006.01)
(Continued)

(52) U.S. Cl.
CPC ........... *G06K 9/00771* (2013.01); *G06N 5/04* (2013.01); *G06N 20/00* (2019.01); *G08B 13/18* (2013.01)

(58) Field of Classification Search
None
See application file for complete search history.

(56) References Cited

U.S. PATENT DOCUMENTS

| 2012/0287222 | A1* | 11/2012 | Liu | H04N 5/23238 348/14.07 |
| 2015/0116488 | A1* | 4/2015 | Shishalov | G08B 17/125 348/143 |

(Continued)

*Primary Examiner* — Kate H Luo
(74) *Attorney, Agent, or Firm* — Schmeiser, Olsen & Watts, LLP

(57) ABSTRACT

A data fusion based safety surveillances system has a first through $N^{th}$ virtual monitoring systems and a data fusion and decision device. The data fusion and decision device defines an $i^{th}$ detection model of the $i^{th}$ virtual monitoring system, and estimates an $i^{th}$ detection loss probability of the $i^{th}$ virtual monitoring system according to detection loss sample numbers of batches of $i^{th}$ monitored data of the $i^{th}$ virtual monitoring system under conditions corresponding to the locations, batches of context data and existence of intruder, the $i^{th}$ detection model, the batches of $i^{th}$ monitored data corresponding to locations of the $i^{th}$ virtual monitoring system and the batches of context data. The data fusion and decision device determines a fusion parameter set according to the first through $N^{th}$ detection loss probabilities, and performs data fusion on a first through $N^{th}$ detection results to generate a decision result.

10 Claims, 2 Drawing Sheets

(51) Int. Cl.
*G08B 13/18* (2006.01)
*G06N 20/00* (2019.01)

(56) References Cited

U.S. PATENT DOCUMENTS

| | | | |
|---|---|---|---|
| 2015/0269745 A1* | 9/2015 | Klimer | G06T 7/194 382/103 |
| 2016/0188388 A1* | 6/2016 | Chan | G06F 9/542 719/318 |
| 2016/0189501 A1* | 6/2016 | Hu | G08B 13/19602 348/152 |
| 2016/0335484 A1* | 11/2016 | Xie | G06K 9/00335 |
| 2018/0211115 A1* | 7/2018 | Klein | G08B 25/10 |

* cited by examiner

DATA FUSION BASED SAFETY SURVEILLANCE SYSTEM AND METHOD

FIELD OF THE INVENTION

The present disclosure relates to safety surveillance technology, and in particular to data fusion based safety surveillance system and method for performing data fusion on detection results of a plurality of virtual monitoring systems formed by one or more physical monitoring systems executing different algorithms so as to determine a decision result.

BACKGROUND OF THE INVENTION

In recent years, safety monitoring technology has become an important technology for the industries and government units to monitor, in particular, buildings or facilities with high technology, military or administrative secret. However, the physical monitoring system has its physical limitations and may lead to detection losses (e.g., a failure to detect an intruder that does exist) or false alarms (e.g., a wrong detection of an intruder that does not exist) because the detection result of the physical monitoring system has been affected by factors such as environmental factor (including weather situation) and so on.

In general, the damage resulting from the detection losses may be greater than that of the false alarms. Hence, a conventional approach is to increase the sensitivity of the physical monitoring system so as to avoid the detection losses. However, such approach may cause the monitoring personnel to receive alarm messages of false alarms frequently, and the monitoring personnel may thus insensitive to the alarm messages and ignore the alarm messages of correct alarms. In addition, replacing the current physical monitoring system with a more accurate physical monitoring system can resolve the above technical problem; however, the replacement may increase the cost additionally.

SUMMARY OF THE INVENTION

Therefore, in order to overcome the deficiencies in the prior art, the embodiments of the present disclosure provide a safety surveillances system and method for fusing multiple detection results of multiple virtual monitoring systems formed at least one existing physical monitoring system executing different algorithms. The safety surveillances system and method can greatly reduce the detection loss probability and the false alarms probability of the entire safety surveillances system without replacing the existing physical monitoring system.

Based on at least one of the foregoing objectives, embodiments of the present disclosure provide a data fusion based safety surveillances system comprising first through $N^{th}$ virtual monitoring systems formed by one or more physical monitoring system executing different algorithms and a data fusion and decision device linking to the first through $N^{th}$ virtual monitoring systems, wherein N is greater than or equal to 2. The data fusion and decision device defines a first through $N^{th}$ detection models of the first through $N^{th}$ virtual monitoring systems, wherein the $i^{th}$ detection model is used to represent a relationship between batches of $i^{th}$ monitored data of the $i^{th}$ virtual monitoring system and a plurality of $i^{th}$ detection results corresponding to the batches of the $i^{th}$ monitored data, wherein i is an integer from 1 to N. The fusion and decision device estimates an $i^{th}$ detection loss probability of the $i^{th}$ virtual monitoring system according to detection loss sample numbers of batches of $i^{th}$ monitored data of the $i^{th}$ virtual monitoring system under conditions corresponding to locations, batches of context data and existence of intruder, the $i^{th}$ detection model, the batches of the $i^{th}$ monitored data corresponding to the locations of the $i^{th}$ virtual monitoring system and the batches of the context data. The data fusion and decision device determines a fusion parameter set according to the first through $N^{th}$ detection loss probabilities; and the data fusion and decision device performs data fusion on a first through $N^{th}$ detection results of the first through $N^{th}$ virtual monitoring systems to generate a decision result.

Based on at least one of the foregoing objectives, embodiments of the present disclosure provide a data fusion based safety surveillances method. First, define the first through $N^{th}$ detection models of the first through $N^{th}$ virtual monitoring systems, wherein the $i^{th}$ detection model is used to represent the relationship between batches of $i^{th}$ monitored data of the $i^{th}$ virtual monitoring system and the plurality of $i^{th}$ detection results corresponding to the batches of the $i^{th}$ monitored data, wherein i is an integer from 1 to N. Estimate the $i^{th}$ detection loss probability of the $i^{th}$ virtual monitoring system according to detection loss sample numbers of batches of $i^{th}$ monitored data of the $i^{th}$ virtual monitoring system under conditions corresponding to locations, batches of context data and existence of intruder, the $i^{th}$ detection model, the batches of the $i^{th}$ monitored data corresponding to the locations of the $i^{th}$ virtual monitoring system and the batches of the context data. Determine the fusion parameter set according to the first through $N^{th}$ detection loss probabilities. Then, perform data fusion on the first through $N^{th}$ detection results of the first through $N^{th}$ virtual monitoring systems to generate the decision result.

Optionally, in this embodiment of the present disclosure, estimate an $i^{th}$ false alarm probability of the $i^{th}$ virtual monitoring system according to false alarm sample numbers of batches of $i^{th}$ monitored data of the $i^{th}$ virtual monitoring system under conditions corresponding to the locations, the batches of the context data and inexistence of intruder, the $i^{th}$ detection model, the batches of $i^{th}$ monitored data corresponding to the locations of the $i^{th}$ virtual monitoring system and the batches of the context data, wherein the fusion parameter set is determined according to the first through $N^{th}$ detection loss probabilities and the first through $N^{th}$ false alarm probabilities.

Optionally, in this embodiment of the present disclosure, the $i^{th}$ detection model is defined by using a machine learning algorithm, an artificial intelligence algorithm or other one model solving algorithm according to acquired batches of known monitored data of the $i^{th}$ virtual monitoring system and known detected results corresponding to the acquired batches of the known monitored data.

Optionally, in this embodiment of the present disclosure, the data fusion is performed by a logic operation function, a reliability rule or a context rule, and the logic operation function, the reliability rule or the context rule is determined by the fusion parameter set.

Optionally, in this embodiment of the present disclosure, each of the batches of the context data is a weather data defining variables of a rainfall, a wind speed, a temperature and a brightness.

Briefly, the data fusion based safety surveillances system and method provided in the embodiments of the present disclosure define multiple detection models of multiple virtual monitoring systems formed by one or more physical monitoring systems executing different algorithms. Then, the detection loss/false alarm probabilities can be estimated by the data fusion based safety surveillances system according to the batches of monitored data of each virtual monitoring system, the detection model of each virtual monitoring system, the batches of the context data and the detection loss sample numbers and the false alarm sample numbers of different conditions of each virtual monitoring system. Then, the data fusion based safety surveillances system determines the data fusion parameter set for data fusion of multiple detection results according to the detection loss/false alarm probability. In this way, the data fusion based safety surveillances system and method provide a low-cost technical solution without adding any new physical monitoring system, and can reduce the overall detection loss probability and overall false alarm probability.

DETAILED DESCRIPTION OF THE PREFERRED EMBODIMENTS

Figure 1:
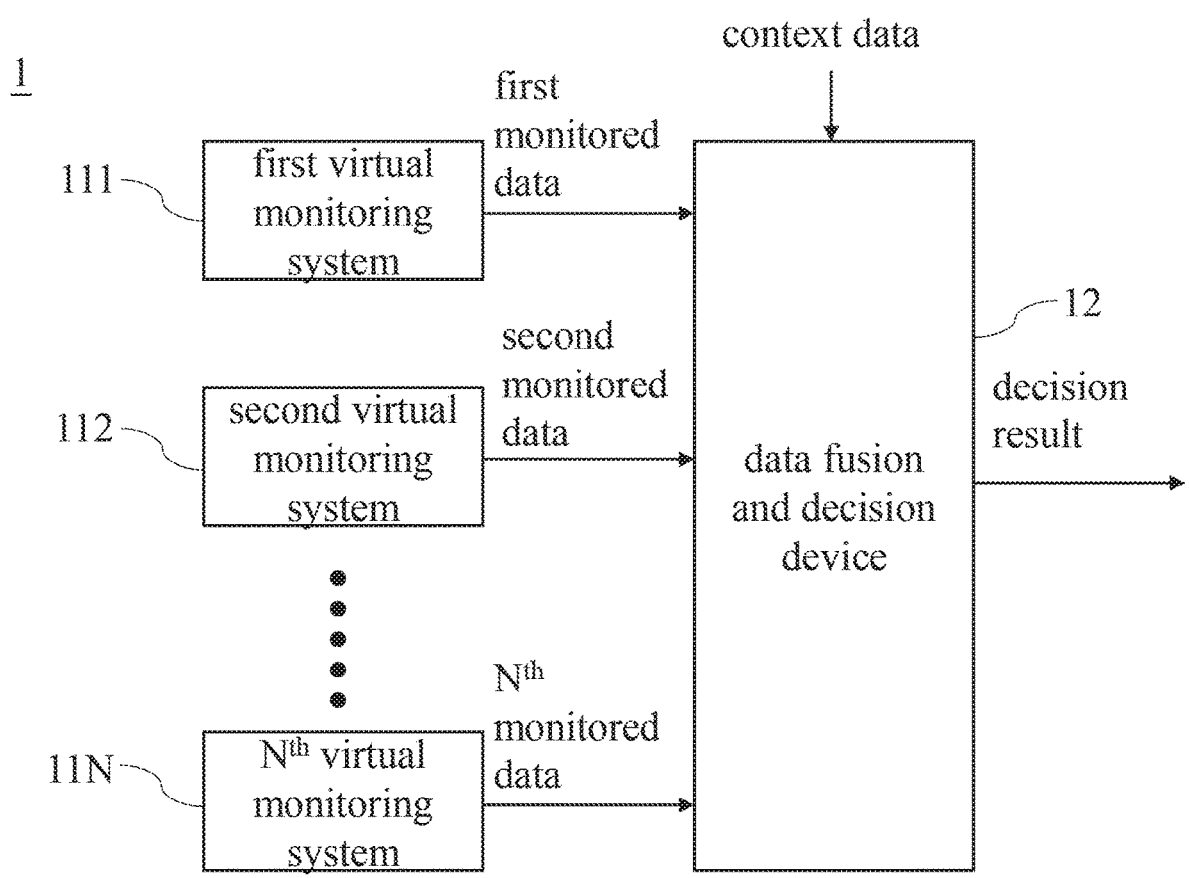
FIG. 1 is a block diagram illustrating a data fusion based safety surveillances system according to an embodiment of the present disclosure.

For a fuller understanding of the objects, features and functions of the present disclosure, the present disclosure will be described in detail by way of the following specific embodiments in conjunction with the accompanying drawings.

An embodiment of the present disclosure provides a data fusion based safety surveillances system and method, which eliminates the need for an additional physical monitoring system, fuses the plurality of detection results of multiple virtual monitoring systems formed by one or more existing physical monitoring systems executing different algorithms, and further generates a decision result.

In an embodiment, a training process is firstly performed on each virtual monitoring system to define each detection model. The training process is illustrated as follows. For each virtual monitoring system, a safety surveillance system and method collect the batches of the known monitored data and known detection results of the virtual monitoring system corresponding to the batches of the known monitored data, and defines a detection model related to the batches of the monitored data and the detection results of the virtual monitoring system by using the machine learning algorithm, the artificial intelligence algorithm or other model solving algorithms. Next, for each virtual monitoring system, the safety surveillances system and method estimate a detection lose probability according to detection loss sample numbers of batches of monitored data under conditions of the intruder existence, context probabilities corresponding to locations, batches of $i^{th}$ monitored data corresponding to the locations and the detection model, and further estimate a false alarm probability according to false alarm sample numbers of batches of monitored data under conditions of intruder inexistence, the context probabilities corresponding to the locations, the batches of monitored data corresponding to the locations and the detection model.

After the training process has been done, the inference process is performed to obtain the decision result. Specifically, the safety surveillances system and method set the fusion parameter set according to the estimated detection loss probability and the false alarm probability of multiple virtual monitoring systems, wherein the fusion parameter set is used to determine the fusion manner of the multiple detection results. Afterwards, the safety surveillances system and method can generate the decision result according to the fusion parameter set and the detection results of multiple virtual monitoring systems (that is, the data fusion of multiple detection results is performed according to the fusion parameter set to generate the decision result).

It should be noted that the damage due to the detection loss may be much larger than the damage due to the false alarm. Therefore, in one embodiment of the present disclosure, the false alarm probability may not be estimated and the safety surveillances system and method may set the fusion parameter set according to the estimated detection loss probability of multiple virtual monitoring systems merely.

Optionally, in one embodiment of the present disclosure, the data fusion manner of multiple detection results can be performed through a logical operation function, and the fusion parameter set can be used to determine the logical operation function of the detection results of multiple virtual monitoring systems. For example, the logic AND operation is performed on partial detection results, the logic OR operation is performed on other partial detection results, and then the logical OR or AND operation is performed on the multiple logic operation results to generate the decision result.

Optionally, in one embodiment of the present disclosure, a data fusion manner of multiple detection results can be performed through a reliability rule, and the fusion parameter set can be used to determine the reliability rule. For example, the decision result is outputted only if the decision result is finally greater than the reliability threshold, or the detection result is used for data fusion only if the reliability of the detection result is greater than the reliability threshold.

Optionally, in one embodiment of the present disclosure, the data fusion manner of multiple detection results can be performed through a context rule, and the fusion parameter set can be used to determine the context rule. For example, each detection result corresponds to context information, such as coordinates, type of object, number of objects and accuracy, and multiple detection results are fused based on the context information according to the context rule.

First, referring to FIG. 1 of the present disclosure, FIG. 1 is a block diagram of a data fusion based safety surveillances system according to an embodiment of the present disclosure. The data fusion based safety surveillances system 1 includes a first virtual monitoring system 111, a second virtual monitoring system 112, . . . , an $N^{th}$ virtual monitoring system 11N and a data fusion and decision device 12, wherein the first virtual monitoring system 111, the second virtual monitoring system 112, . . . and the $N^{th}$ virtual monitoring system 11N connect to the data fusion and decision device 12 by wire or wirelessly.

It should be noted that, in practice, each of the one or more physical monitoring systems has different algorithms, so to form the first through $N^{th}$ virtual monitoring systems 111-11N, and that is, each of the first through $N^{th}$ virtual monitoring systems 111-11N is generated by a physical monitoring system based on one of the algorithms. The foregoing physical monitoring system is, for example, a thermal imaging system, an electronic fence system, a laser ranging system or a virtual wall system, but the disclosure is not limited thereto. The variable N can be an integer. For example, there are two physical monitoring systems respectively having one algorithm and two algorithms to be executed, and thus N can be 3. However, the present disclosure is not limited thereto.

The data fusion and decision device 12 includes a plurality of circuits which are configured to make the data fusion and decision device 12 have computability. For example, the data fusion and decision device 12 is a general-purpose computer that has a corresponding software program installed thereon to perform related operations, so as to execute steps required by the data fusion and decision device 12 and to achieve functions specified by the data fusion and decision device 12.

In general, thermal imaging systems are susceptible to temperature effects. Electronic fence systems or laser ranging systems are susceptible to moisture interference due to the characteristics of the band of the detected signal. In addition, the virtual wall system is provided by the visible light camera as the source of the image for identification. Therefore, once the image quality is poor or the natural conditions affect (for example, there is no light at night, the wind speed is too high causing the leaves to shake, or the number of the image pixels (i.e. the image resolution) is not enough), the final detection result of the virtual wall system will be directly or indirectly affected. Therefore, it can be understood that context data is an important factor that affects the detection results of the above-mentioned virtual monitoring systems. From the above example, the context data can be, for example, the weather data including the variables of humidity, wind speed, temperature, brightness and so on. However, the present disclosure does not limit that the context data must be the weather data.

Since the environment may have an impact on the detection result of the virtual monitoring system, context factors still must be taken into consideration when estimating the detecting loss probability and the false alarm probability. Take the context data being the weather data as an example, the humidity can be expressed as a binary value of "rainy day" or "no rain" or simply expressed as amounts of the rainfall; the wind speed can be expressed as a ternary value of "windless", "breeze" or "strong wind", or simply expressed as degrees of the wind force; the temperature can be expressed as a binary value of "low temperature" or "high temperature", or simply expressed as a temperature value; and the brightness can be expressed as a binary value of "daytime" or "night", or simply expressed as a brightness value.

The data fusion and decision device 12 collects multiple batches of known first through $N^{th}$ monitored data of the first virtual monitoring system 111, the second virtual monitoring system 112, . . . , the Nth virtual monitoring system 11N and known first through $N^{th}$ detection results. The foregoing multiple batches of known first monitored data, the second monitored data, and the $N^{th}$ monitored data are respectively multiple batches of raw data of detection loss and false alarm of the first virtual monitoring system 111, the second virtual monitoring system 112, . . . , the $N^{th}$ virtual monitoring system 11N, and thus it can facilitate to reduce the subsequent calculation of the detection loss sample numbers and the false alarm sample numbers of the batches of the monitored data under different conditions with and without an intruder. However, the present disclosure is not limited thereto. The foregoing multiple batches of known first monitored data, second monitored data, and $N^{th}$ monitored data can also be the raw data out of the detection loss and false alarm raw data of the first virtual monitoring system 111, the second virtual monitoring system 112, . . . , the $N^{th}$ virtual monitoring system 11N, but in this case, the additional calculation of the detection loss sample numbers and the false alarm sample numbers of the batches of the monitored data under different conditions with and without an intruder is required.

Then, the data fusion and decision device 12 can define the $i^{th}$ detection model with the relationship between the batches of the $i^{th}$ monitored data and the $i^{th}$ detection results according to the multiple batches of the known $i^{th}$ monitored data of the $i^{th}$ virtual monitoring system and the multiple batches of the known multiple $i^{th}$ detection results corresponding to the batches of the known $i^{th}$ monitored data by using a machine learning algorithm, an artificial intelligence algorithm or other model solving algorithms (that is, the present disclosure does not limit the behavior of the algorithms with solution finding model), wherein i is an integer being 1 through N. Afterwards, the data fusion and decision device 12 estimates an $i^{th}$ detection loss probability of the $i^{th}$ virtual monitoring system according to the detection loss sample numbers of the batches of the $i^{th}$ monitored data of the $i^{th}$ virtual monitoring system under conditions corresponding to the locations, the batches of context data and existence of intruder, batches of context data (used to obtain the context probabilities of multiple locations), the batches of $i^{th}$ monitored data corresponding to the locations and the $i^{th}$ detection model of the $i^{th}$ virtual monitoring system; and the fusion and decision 12 device further estimates an $i^{th}$ false alarm probability of the $i^{th}$ virtual monitoring system according to the false alarm sample numbers of the batches of the $i^{th}$ monitored data of the $i^{th}$ virtual monitoring system under conditions corresponding to the locations, the batches of context data and inexistence of intruder, the batches of context data (used to obtain the context probabilities of multiple locations), the batches of $i^{th}$ monitored data corresponding to the locations and the $i^{th}$ detection model of the $i^{th}$ virtual monitoring system.

Then, the data fusion and decision device 12 sets a fusion parameter set according to the first through $N^{th}$ detection loss probabilities of the first through $N^{th}$ virtual monitoring systems 111-11N and the first through $N^{th}$ false alarm probability of the first through $N^{th}$ virtual monitoring systems 111-11N, wherein the fusion parameter set is used for determining a fusion manner of the first through $N^{th}$ detection results of the first through $N^{th}$ virtual monitoring systems 111-11N. Then, the data fusion and decision device 12 generates a decision result according to the fusion parameter set and the first through $N^{th}$ detection results of the first through $N^{th}$ virtual monitoring systems 111-11N to determine whether an intruder intrudes.

For example, the data fusion manner of the first through $N^{th}$ detection results of the first through $N^{th}$ monitoring systems 111-11N can be performed through a logic operation function, and the fusion parameter set can be used to determine the logical operation function of the first through $N^{th}$ detection results of the first through $N^{th}$ monitoring systems 111-11N. For example, if N is 3, then the logical AND operation is performed on the first and second detection results, and the logical OR operation is performed on the acquired operation result and the third detection result to acquire the decision result.

Next, the details of estimating the $i^{th}$ detection loss probability and the $i^{th}$ false alarm probability of the $i^{th}$ virtual monitoring system are further described as follows. The $i^{th}$ detection loss probability of the $i^{th}$ virtual monitoring system can be expressed as: $M_{i,l}=\Sigma_k \iint (1-R_{i,l}(y^{i,k}))p(y^{i,k},W_m,L_k|H_1) dy^{i,k}dW_m$ (abbreviated as formula 1), wherein variables i, k and l respectively represent a virtual monitoring system index value, a location index value and a parameter set index value, a variable $L_k$ represents the location corresponding to the location index value k, a variable $y^{i,k}$ represents the $i^{th}$ monitored data acquired by the $i^{th}$ virtual monitoring system at the location $L_k$, a function $R_{i,l}(y^{i,k})$ represents the $i^{th}$ detection result of the $i^{th}$ virtual monitoring system based on the $i^{th}$ monitored data $y^{i,k}$ when the $1^{th}$ parameter set is adopted, the function $R_{i,l}(y^{i,k})$ can be 1 or 0 for indicating whether an intruder is detected, the variable $H_1$ represents a condition that the intruder intrudes, a variable $W_m$ represents a vector of the context data (as mentioned above, for example, the context data can be the weather data which is defined to include four variables of humidity, wind speed, temperature and brightness), the parameter set index value 1 is determined by the location $L_k$ and context data $W_m$, and a function $p(y^{i,k},W_m,L_k|H_1)$ represents a joint probability of that the $i^{th}$ virtual monitoring system is located at the location $L_k$, the context data is $W_m$ and the $i^{th}$ monitored data is $y^{i,k}$ under the condition of existence of intruder (intruder existence).

Because the detection results of the thermal imaging system and the virtual wall system may be affected due to the shaking of the leaves of the surrounding trees, the detection results of the electronic fence system may be affected easily due to the sensitivity to the groundwater or puddles, and the virtual monitoring systems generated from the above physical monitoring systems by executing different algorithms may also be very sensitive to the terrain of the slopes. Therefore, the function $p(y^{i,k},W_m,L_k|H_1)$ in the above formula 1 can be simplified and rewritten as $p(y^{i,k},W_m,L_k|H_1)=p(y^{i,k}|H_1,W_m,L_k)p(W_m,L_k)$ (abbreviated as formula 2), wherein a function $p(y^{i,k}|H_1,W_m,L_k)$ represents a probability that the $i^{th}$ monitored data of the $i^{th}$ virtual monitoring is $y^{i,k}$ of condition of the location being at the location $L_k$, the context data being $W_m$ and existence of intruder, and the function $p(W_m,L_k)$ represents a probability that the location is at the location $L_k$ and the context data is $W_m$ (that is, the context probability at the location $L_k$).

Since the variable $p(W_m,L_k)$ is independent to the condition of $H_1$, the formula 2 can be rewritten into $M_{i,l}=\Sigma_k \int E_{y|W_m,L_k,H_1}(1-R_{i,l}(y^{i,k}))p(W_m,L_k)dW_m$ (abbreviated as formula 3) through putting the formula 2 into the formula 1, wherein $E_{y|W_m,L_k,H_1}$ is an expected value of the $i^{th}$ monitored data of the $i^{th}$ virtual monitoring system of condition of the location being at the location $L_k$, the environmental context data being $W_m$ and existence of intruder.

Then, using the statistical concept that the sample number approximates the expected value, the formula 3 can be rewritten as $M_{i,l}=\Sigma_k \int S_{y|W_m,L_k,H_1}(1-R_{i,l}(W_m,L_k))dW_m$ (abbreviated as formula 4), wherein $S_{y|W_m,L_k,H_1}$ is a detection sample number of the batches of $i^{th}$ monitored data of the $i^{th}$ virtual monitoring system under the condition of the location being at the location $L_k$, the context data being $W_m$ and existence of intruder.

Since the $i^{th}$ detection result $R_{i,l}(y^{i,k})$ cannot be obtained from the $i^{th}$ monitored data of the $i^{th}$ virtual monitoring system, the machine learning algorithm, artificial intelligence algorithm or other model solving algorithm can be used to define the detection model of the $i^{th}$ monitored data $y^{i,k}$ and the $i^{th}$ measurement result $R_{i,l}(y^{i,k})$ according to the known $i^{th}$ monitored data $y^{i,k}$ and the known corresponding detection result $R_{i,l}(y^{i,k})$, and that is, the model of the function $R_{i,l}(y^{i,k})$ can be known. Then, through the formula 4 and based on the detection model of the $i^{th}$ virtual monitoring system, the $i^{th}$ detection loss probability of the $i^{th}$ virtual monitoring system can be estimated according to the context data $W_m$ (the context probability of location $L_k$ can be known through statistics), the location $L_k$, the detection loss sample number of the batches of the $i^{th}$ monitored data $y^{i,k}$ of the $i^{th}$ virtual monitoring system under the condition of the location being at the location $L_k$, the context data being $W_m$ and existence of intruder and the $i^{th}$ monitored data $y^{i,k}$ of each location $L_k$.

Similarly, the false alarm probability of the $i^{th}$ virtual monitoring system can be expressed as: $F_{i,l}=\Sigma_k \int \int R_{i,l}(y^{i,k})p(y^{i,k},W_m,L_k|H_0)dy^{i,k}dW_m$ (abbreviated as formula 5), wherein the function $p(y^{i,k},W_m,L_k|H_0)$ represents the joint probability that the $i^{th}$ virtual monitoring system is located at position $L_k$, the context data is $W_m$ and the $i^{th}$ monitored data is $y^{i,k}$ of condition of inexistence of intruder (or intruder inexistence), and the variable $H_0$ represents the condition that no intruder intrudes. Based on a similar derivation, the formula 5 can therefore be simplified to $M_{i,l}=\Sigma_k \int E_{y|W_m,L_k,H_0}R_{i,l}(y^{i,k})p(W_m,L_k)dW_m$ (abbreviated as formula 6), wherein $S_{y|W_m,L_k,H_0}$ is the false alarm sample number of the batches of the $i^{th}$ monitored data of the $i^{th}$ virtual monitoring system under the condition of the location being at the location $L_k$, the context data being $W_m$ and inexistence of intruder.

Then, through formula 6, based on the detection model of the $i^{th}$ virtual monitoring system, the false alarm probability of the $i^{th}$ virtual monitoring system can be estimated according to the context data $W_m$ (the context probability of the location $L_k$ can be known through statistics), the false alarm sample number of the batches of the $i^{th}$ monitored data of the $i^{th}$ virtual monitoring system under the condition of the location being at the location $L_k$, the environment context data being $W_m$ and inexistence of intruder and the $i^{th}$ monitored data $y^{i,k}$ of each location. After acquiring of the first through $N^{th}$ detection loss probabilities and the first through $N^{th}$ false alarm probabilities of the first through $N^{th}$ virtual monitoring systems 111-11N, the fusion parameter set can be determined according to the estimated first through $N^{th}$ detection loss probabilities and the first through $N^{th}$ false alarm probabilities, and then the first through $N^{th}$ detection results of the first through $N^{th}$ virtual monitoring systems 111-11N can be fused based on the fusion parameter set to generate the decision result. In this way, it is possible to generate more accurate decision result by using the detection results of the virtual monitoring systems formed by at least one physical monitoring system executing different algorithms, so as to reduce the overall the detection loss probability and the overall false alarm probability of the data fusion based safety surveillance system 1.

Figure 2:
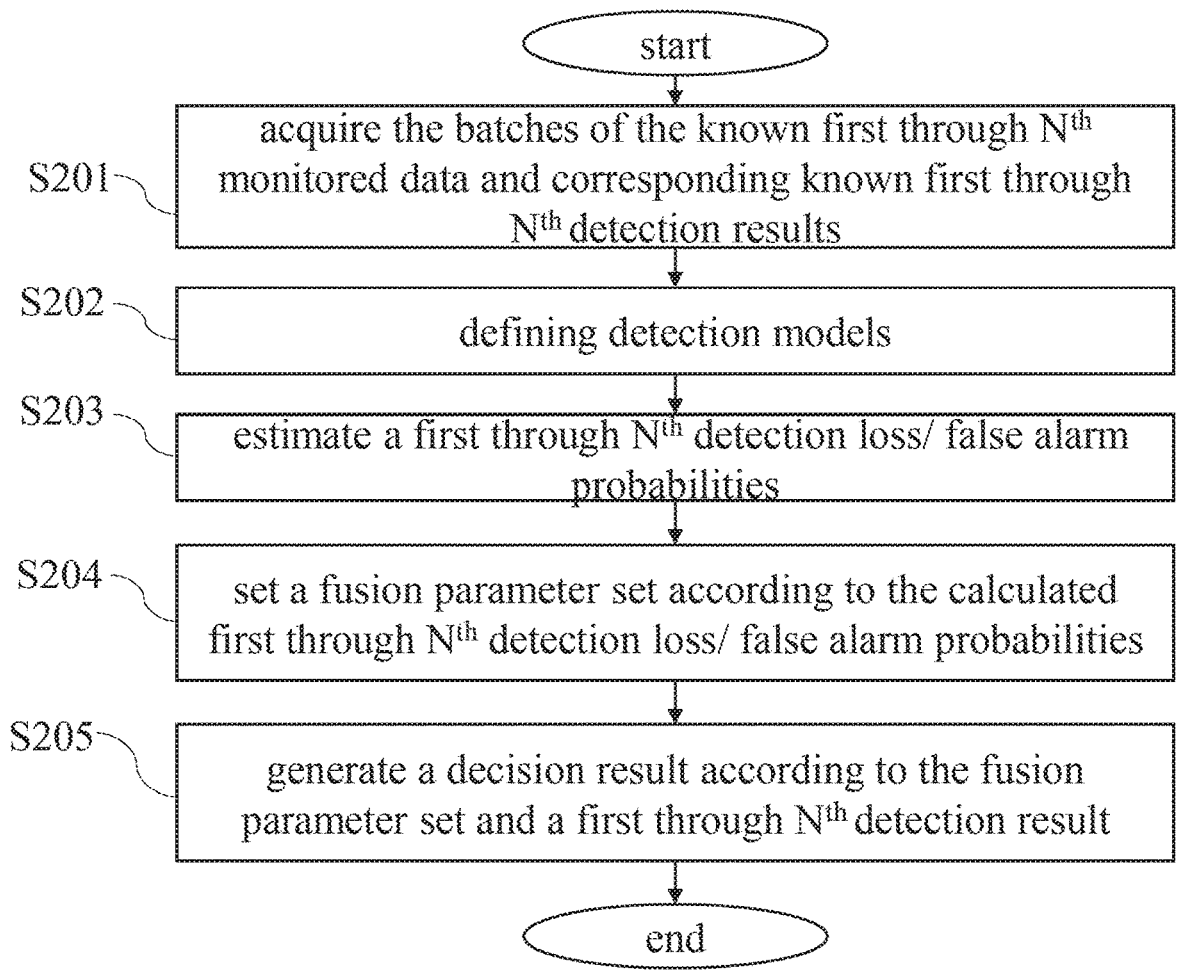
FIG. 2 is a flowchart illustrating a data fusion based safety surveillances method according to an embodiment of the present disclosure.
Figure 3:
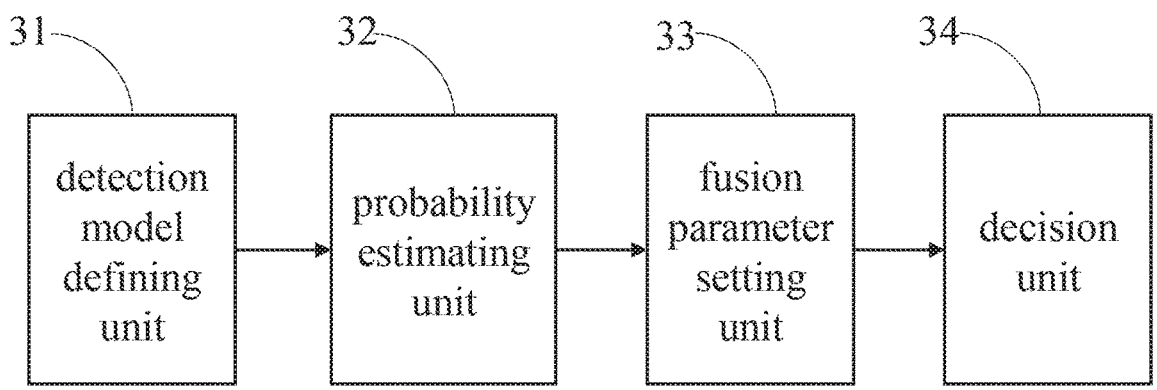
FIG. 3 is a block diagram illustrating a data fusion and decision device according to an embodiment of the present disclosure.

Then, referring to FIG. 2 and FIG. 3, FIG. 2 is a flow chart of a data fusion based safety surveillance method according to an embodiment of the present disclosure, and FIG. 3 is a block diagram of a data fusion and decision device according to an embodiment of the present disclosure. The data fusion based safety surveillance method of FIG. 2 can be implemented by the data fusion and decision device 12 of FIG. 1, and the data fusion and decision device 12 can be implemented by the data fusion and decision device 3 of FIG. 3.

The data fusion and decision device 3 of FIG. 3 is configured by a plurality of hardware circuits (or a cooperation of the hardware circuits and the software) to include a detection model acquiring unit 31, a probability estimating unit 32, a fusion parameter setting unit 33 and a decision unit 34, wherein the detection model defining unit 31 is connected to the probability estimating unit 32, the probability estimating unit 32 is connected to the fusion parameter setting unit 33 and the fusion parameter setting unit 33 is connected to the decision unit 34.

First, at step S201, the detection model defining unit 31 acquires the batches of the known first through $N^{th}$ monitored data and the batches of the known first through $N^{th}$ detection results of the first through $N^{th}$ virtual monitoring systems, wherein the batches of the known first through $N^{th}$ detection results correspond to the batches of the known first through $N^{th}$ monitored data. Then, at step S202, the detection model defining unit 31 defines the detection model of the first through $N^{th}$ virtual monitoring systems through a model solving algorithm (for example, through a machine learning algorithm, an artificial intelligence algorithm or other model solving algorithm), wherein the detection model of the $i^{th}$ virtual monitoring system is defined based on the batches of the known $i^{th}$ monitored data and the batch of the known corresponding $i^{th}$ detection results.

Then, at step S203, the probability estimating unit 32 estimates a $i^{th}$ detection loss probability of the $i^{th}$ virtual monitoring system according to batches of context data (context probability of each location can be known through statistics), the batches of $i^{th}$ monitored data corresponding to the locations, the detection loss sample numbers of the batches of $i^{th}$ monitored data of the $i^{th}$ virtual monitoring system under conditions corresponding to the locations, the batches of context data and existence of intruder and the detection model of the $i^{th}$ virtual monitoring system; and the probability estimating unit 32 further estimates a $i^{th}$ false alarm probability of the $i^{th}$ virtual monitoring system according to batches of context data (context probability of each location can be known through statistics), the batches of $i^{th}$ monitored data corresponding to the locations, the false alarm sample numbers of the batches of $i^{th}$ monitored data of the $i^{th}$ virtual monitoring system under corresponding to the locations, the batches of context data and inexistence of intruder and the detection model of the plurality of the $i^{th}$ virtual monitoring system.

Then, at step S204, the fusion parameter setting unit 33 sets the fusion parameter set according to the estimated $i^{th}$ through $N^{th}$ detection loss probabilities and the estimated $i^{th}$ through $N^{th}$ false alarm probabilities of the $i^{th}$ through $N^{th}$ virtual monitoring systems. Then, at step S205, the decision unit 34 performs data fusion of the $i^{th}$ through $N^{th}$ detection results of the $i^{th}$ through $N^{th}$ virtual monitoring systems according to the fusion parameter set to generate the decision result.

Accordingly, without adding any physical monitoring system, the data fusion based safety surveillances system and method provided by the embodiments of the present disclosure uses the detection results of the virtual monitoring systems formed by at least one existing physical monitoring system executing different algorithms to perform the data fusion of the detection results, so as to generate a decision result, and to reduce the overall detection loss and false alarm probabilities. In other words, the data fusion based safety surveillances system and method provide a low-cost technical solution to reduce the detection loss and false alarm probabilities of the safety surveillances system.

The present disclosure has been disclosed in the above paragraphs with reference to the preferred embodiments. However, it should be understood by those skilled in the art that the foregoing embodiments are merely used to describe the present disclosure, and should not be construed as limiting the scope of the present. It should be noted that variations and substitutions equivalent to those of the foregoing embodiments should be construed to be included within the scope of the present disclosure. Therefore, the protection scope of the present disclosure should be based on the scope of the claims.

What is claimed is:

1. A data fusion based safety surveillances system comprises:
    a first through $N^{th}$ virtual monitoring systems formed by one or more physical monitoring system executing different algorithms, wherein N is greater than or equal to 2; and
    a data fusion and decision device linking to the first through $N^{th}$ virtual monitoring systems for defining a first through $N^{th}$ detection models of the first through $N^{th}$ virtual monitoring systems, wherein the $i^{th}$ detection model is used to represent a relationship between batches of $i^{th}$ monitored data of the $i^{th}$ virtual monitoring system and a plurality of $i^{th}$ detection results corresponding to the batches of the $i^{th}$ monitored data, wherein i is an integer from 1 to N;
    wherein the fusion and decision device estimates an $i^{th}$ detection loss probability of the $i^{th}$ virtual monitoring system according to (1) detection loss sample numbers of the batches of the ith monitored data of the ith virtual monitoring system under conditions, (2) the ith detection model, (3) the batches of the ith monitored data and (4) the batches of the context data, wherein the conditions are corresponding to locations, batches of context data and existence of intruder;
    the data fusion and decision device determines a fusion parameter set according to the first through $N^{th}$ detection loss probabilities; and the data fusion and decision device performs data fusion on a first through $N^{th}$ detection results of the first through $N^{th}$ virtual monitoring systems to generate a decision result.

2. The data fusion based safety surveillances system of claim 1, wherein the fusion and decision device estimates an $i^{th}$ false alarm probability of the $i^{th}$ virtual monitoring system according to false alarm sample numbers of the batches of the $i^{th}$ monitored data of the $i^{th}$ virtual monitoring system under conditions corresponding to the locations, the batches of the context data and inexistence of intruder, the $i^{th}$ detection model, the batches of $i^{th}$ monitored data corresponding to the locations of the $i^{th}$ virtual monitoring system and the batches of the context data, and the fusion and decision device determines the fusion parameter set according to the first through $N^{th}$ detection loss probabilities and the first through $N^{th}$ false alarm probabilities.

3. The data fusion based safety surveillances system of claim 1, wherein the $i^{th}$ detection model is defined by using a machine learning algorithm, an artificial intelligence algorithm or other one model solving algorithm according to acquired batches of known monitored data of the $i^{th}$ virtual monitoring system and known detected results corresponding to the acquired batches of the known monitored data.

4. The data fusion based safety surveillances system of claim 1, wherein the data fusion is performed by a logic operation function, a reliability rule or a context rule, and the logic operation function, the reliability rule or the context rule is determined by the fusion parameter set.

5. The data fusion based safety surveillances system of claim 1, wherein each of the batches of context data is a weather data defining variables of a rainfall, a wind speed, a temperature and a brightness.

6. A data fusion based safety surveillances method comprises:
    defining a first through $N^{th}$ detection models of the first through $N^{th}$ virtual monitoring systems, wherein the $i^{th}$ detection model is used to represent a relationship between batches of $i^{th}$ monitored data of the $i^{th}$ virtual monitoring system and a plurality of $i^{th}$ detection results corresponding to the batches of the $i^{th}$ monitored data, wherein i is an integer from 1 to N;

estimating an $i^{th}$ detection loss probability of the $i^{th}$ virtual monitoring system according to (1) detection loss sample numbers of the batches of the ith monitored data of the ith virtual monitoring system under conditions, (2) the ith detection model, (3) the batches of the ith monitored data and (4) the batches of the context data, wherein the conditions are corresponding to locations, batches of context data and existence of intruder;

determining a fusion parameter set according to the first through $N^{th}$ detection loss probabilities; and performing data fusion on a first through $N^{th}$ detection results of the first through $N^{th}$ virtual monitoring systems to generate a decision result.

7. The data fusion based safety surveillances method of claim 6 further comprises:

estimating an $i^{th}$ false alarm probability of the $i^{th}$ virtual monitoring system according to false alarm sample numbers of the batches of the $i^{th}$ monitored data of the $i^{th}$ virtual monitoring system under conditions corresponding to the locations, the batches of the context data and inexistence of intruder, the $i^{th}$ detection model, the batches of $i^{th}$ monitored data corresponding to the locations of the $i^{th}$ virtual monitoring system and the batches of the context data, wherein the fusion parameter set is determined according to the first through $N^{th}$ detection loss probabilities and the first through $N^{th}$ false alarm probabilities.

8. The data fusion based safety surveillances method of claim 6, wherein the $i^{th}$ detection model is defined by using a machine learning algorithm, an artificial intelligence algorithm or other one model solving algorithm according to acquired batches of known monitored data of the $i^{th}$ virtual monitoring system and known detected results corresponding to the acquired batches of the known monitored data.

9. The data fusion based safety surveillances method of claim 6, wherein the data fusion is performed by a logic operation function, a reliability rule or a context rule, and the logic operation function, the reliability rule or the context rule is determined by the fusion parameter set.

10. The data fusion based safety surveillances method of claim 6, wherein each of the batches of the context data is a weather data defining variables of a rainfall, a wind speed, a temperature and a brightness.

* * * * *